(12) United States Patent
Kärkkäinen et al.

(10) Patent No.: US 10,303,389 B2
(45) Date of Patent: May 28, 2019

(54) METHOD AND APPARATUS FOR ASSEMBLING DATA OBJECTS INTO A VIRTUAL CONTAINER HAVING HIERARCHICAL CLUSTER OR BLOCK SIZE

(71) Applicant: Gurulogic Microsystems Oy, Turku (FI)

(72) Inventors: Tuomas Kärkkäinen, Turku (FI); Ossi Kalevo, Akaa (FI)

(73) Assignee: GURULOGIC MICROSYSTEMS OY, Turku (FI)

( * ) Notice: Subject to any disclaimer, the term of this patent is extended or adjusted under 35 U.S.C. 154(b) by 0 days.

(21) Appl. No.: 15/756,688

(22) PCT Filed: Sep. 5, 2016

(86) PCT No.: PCT/EP2016/025095
§ 371 (c)(1),
(2) Date: Mar. 1, 2018

(87) PCT Pub. No.: WO2017/036606
PCT Pub. Date: Mar. 9, 2017

(65) Prior Publication Data
US 2018/0246646 A1 Aug. 30, 2018

(30) Foreign Application Priority Data
Sep. 3, 2015 (GB) .................................. 1515658.1

(51) Int. Cl.
*G06F 3/06* (2006.01)
*G06F 12/02* (2006.01)

(52) U.S. Cl.
CPC ............ *G06F 3/064* (2013.01); *G06F 3/0604* (2013.01); *G06F 3/0608* (2013.01);
(Continued)

(58) Field of Classification Search
CPC ...... G06F 3/0608; G06F 3/064; G06F 3/0643; G06F 12/0238
See application file for complete search history.

(56) References Cited

U.S. PATENT DOCUMENTS 9,875,182 B1 * 1/2018 Wallace .............. G06F 12/0623
2005/0160309 A1 7/2005 Golding
(Continued)

FOREIGN PATENT DOCUMENTS

GB        2536299 A     9/2016
WO     WO-9532471 A1 * 11/1995 ........... G06F 3/0601

OTHER PUBLICATIONS

Data cluster—Wikipedia, the free encyclopedia (accessed Feb. 27, 2018): URL: https://en.wikipedia.org/wiki/Data_cluster, 2 pages.
(Continued)

*Primary Examiner* — Hal Schnee
(74) *Attorney, Agent, or Firm* — Ziegler IP Law Group, LLC

(57) ABSTRACT

A device includes a data memory managed by a filing system configured to store data in respect of one or more clusters or blocks within the data memory. The device (10) is configured to assemble data content objects into a virtual container;

store the virtual container and associated data content objects into one or more of the one or more clusters or blocks, wherein the data content objects are memory-aligned within the one or more clusters or blocks; and arrange for the data content objects to be individually accessible in their virtual container.

14 Claims, 9 Drawing Sheets

(52) U.S. Cl.
CPC .......... *G06F 3/0638* (2013.01); *G06F 3/0643* (2013.01); *G06F 3/0665* (2013.01); *G06F 3/0673* (2013.01); *G06F 12/0238* (2013.01)

(56) References Cited

U.S. PATENT DOCUMENTS

| | | | | |
|---|---|---|---|---|
| 2006/0015473 | A1* | 1/2006 | Swan | G06F 17/30067 |
| 2007/0143566 | A1* | 6/2007 | Gorobets | G06F 12/0292 |
| | | | | 711/202 |
| 2007/0239927 | A1* | 10/2007 | Rogers | G06F 3/061 |
| | | | | 711/103 |
| 2008/0270461 | A1 | 10/2008 | Gordon et al. | |
| 2009/0112951 | A1 | 4/2009 | Ryu et al. | |
| 2010/0082537 | A1* | 4/2010 | Lasser | G06F 3/0608 |
| | | | | 707/610 |
| 2010/0174599 | A1* | 7/2010 | Rosenblatt | G06Q 30/02 |
| | | | | 705/14.37 |
| 2011/0035557 | A1 | 1/2011 | Luukkainen | |
| 2011/0040795 | A1 | 2/2011 | Gordon et al. | |
| 2011/0106806 | A1 | 5/2011 | Tamas et al. | |
| 2012/0239921 | A1* | 9/2012 | Fallon | G06F 3/0613 |
| | | | | 713/2 |
| 2013/0080403 | A1* | 3/2013 | Yamakawa | G06F 17/30179 |
| | | | | 707/690 |
| 2013/0111182 | A1 | 5/2013 | Aslot et al. | |
| 2013/0139023 | A1* | 5/2013 | Han | G11B 20/1833 |
| | | | | 714/752 |

OTHER PUBLICATIONS

Non-volatile memory—Wikipedia, the free encyclopedia (accessed Feb. 27, 2018). URL: https://en.wikipedia.org/wiki/Non-volatile_memory, 6 pages.

Ink (Unix)—Wikipedia, the free encyclopedia (accessed Feb. 27, 2018): URL: https://en.wikipedia.org/wiki/Link_%28Unix%29, 2 pages.

User space—Wikipedia, the free encyclopedia (accessed Feb. 27, 2018): URL: https://en.wikipedia.org/wiki/User_space, 3 pages.

Mount (computing)—Wikipedia, the free encyclopedia (accessed Mar. 1, 2018): URL: https://en.wikipedia.org/wiki/Mount_%28computing%29Network File System—Wikipedia, the free encyclopedia (accessed Aug. 17, 2015): URL: https://en.wikipedia.org/wiki/Network_File_System, 2 pages.

Virtual file system—Wikipedia, the free encyclopedia (accessed Feb. 27, 2018: URL: https://en.wikipedia.org/wiki/Virtual_file_system, 4 pages.

Network File System—Wikipedia, the free encyclopedia (accessed Feb. 27, 2018): URL: https://en.wikipedia.org/wiki/Network_File_System, 6 pages.

Building the System | Android Open Source Project (accessed Feb. 27, 2018): URL: https://source.android.com/source/building.html, 4 pages.

Solid-state drive—Wikipedia, the free encyclopedia (accessed Feb. 27, 2018): URL: https://en.wikipedia.org/wiki/Solid-state_drive, 39 pages.

FUSE: Filesystem in Userspace (accessed Feb. 27, 2018): URL: http://fuse.sourceforge.net/ https://en.wikipedia.org/wiki/Filesystem_in_Userspace, 3 pages.

Fstab—Wikipedia, the free encyclopedia (accessed Feb. 27, 2018): URL: https://en.wikipedia.org/wiki/Fstab, 5 pages.

GB Intellectual Property Office, Examination Report under Section 18(3), Application No. GB1515658.1, dated Nov. 17, 2016, 6 pages.

GB Intellectual Property Office, Combined Search and Examination Report under Sections 17 and 18(3), Application No. 1515658.1, dated Sep. 22, 2015, 9 pages.

GB Intellectual Property Office, Examination Report under 18(3) Application No. 1515658.1, dated Jan. 8, 2016, 5 pages.

GB Intellectual Property Office, Examination Report under Section 18(3), Application No. 1515658.1, 8 pages.

International Preliminary Report on Patentability, Application No. PCT/EP2016/025095, dated Sep. 5, 2016, 8 pages.

* cited by examiner

METHOD AND APPARATUS FOR ASSEMBLING DATA OBJECTS INTO A VIRTUAL CONTAINER HAVING HIERARCHICAL CLUSTER OR BLOCK SIZE

TECHNICAL FIELD

The present disclosure relates to methods of operating data memory, and also to devices which utilize the methods. Moreover, the present disclosure is concerned with computer program products comprising a non-transitory computer-readable storage medium having computer-readable instructions stored thereon, the computer-readable instructions being executable by a computerized device comprising processing hardware to execute aforesaid methods.

BACKGROUND

Conventionally, portable electronic devices including one or more processors, data memory and a graphical user interface (GUI), for example games terminals and smart phones, employ icons to represent different functional options that are available to a user. Such icons, by way of their visual appearance, identify their corresponding functions. For example, the icons correspond to software applications, namely "Apps", which have been downloaded to the portable electronic devices.

A term "slack space" has commonly been used to refer to an unused memory space caused by files that are smaller than a cluster (namely a "data cluster") or a block (namely a block as a physical record) determined in a file system of the aforementioned portable electronic devices; the file system is operable to store software applications in the clusters, allocating a cluster per software application, wherein the software application has a size that is often considerably smaller than the size of a cluster. Such slack space as a technical problem has however not been considered to be bad enough to warrant changes, because the average file size in such a file system has been considerably larger, and the price of non-volatile memory has previously not been significant in the production costs of the portable electronic devices. However, recently, the situation has changed as regards integrated systems and new non-mechanical, electrically-addressed ROM memories that are considerably more expensive than mechanically-addressed memories. Therefore, the technical problem has not been recognized earlier and thus there has hitherto been no need to find a technical solution for the technical problem. Moreover, along with the development of better compression methods, such as proprietary GMVC® associated with Gurulogic Microsystems Oy, Finland, the file sizes have become increasingly smaller, which in turn has increased the slack space, for example as aforementioned wherein a compressed software application is considerably smaller in size than a cluster. Thus, there is an increased need to address such inefficiencies related to storage of data.

Gurulogic Microsystems®, namely a trademark of Gurulogic Microsystems Oy, Finland has previously invented a method of communicating data, as described in a published patent application GB 1504336.7, reference [3], namely "Method of Communicating Data Packets within Data Communication Systems"; the method produces optimal data packets for transfer in networks and file systems, thereby achieving a very cost-efficient data transfer mechanism that yields an almost theoretically maximal transfer capacity of information. It is used to combine different types of data together based upon their priorities, and it offers a better user experience than known prior art techniques, especially when employed in interactive communication systems.

Another known example of data compression concerns archives such as TAR or ZIP; TAR and ZIP are both able to archive, and if necessary to compress, a large number of files into one physical file that thus comprises an optimal data container; however, there is a technical disadvantage that files inside the archive cannot be used individually, directly without extracting the files physically into another location.

It is previously known that contemporary database systems such as Oracle, MS-SQL, MySQL and MariaDB function as highly advanced and optimal data containers; "Oracle" is a registered trademark. It is also known that their technical implementation enables a cost-efficient solution to be achieved; databases store files in the binary (BLOB) format into a database table, that usually together comprise a large physical file.

One example of such is the software application Dropbox, which integrates itself into an existing file system, thereby enabling use of files directly as if they would physically exist in the existing file system; "Dropbox" is a registered trademark. Such an approach enables an optimized data container to be achieved, except that a Dropbox-style service operates in a computing cloud environment, and is not suitable for use in a local manner in portable electronic devices. "Cloud" refers to data storage capacity available in a data communication network, for example in the contemporary Internet, even if users are unaware precisely where in the data communication network their data is stored; such cloud-based data storage usually occurs at one or more servers located in the data communication network.

Another known virtual file system based on use of a single file, described in reference [7], operates by having its files located in a virtual drive, wherein the files are directly usable individually without extraction or any additional copying into a physical location. However, even the virtual file systems are formatted into clusters (data clusters) or blocks (blocks as physical record) of pre-determined fixed size, and thus they still cause a slack space problem that is described and addressed in the present disclosure.

When a portable electronic device employs clusters as a minimum file system storage unit, use of sophisticated optimized data compression results in data, for example corresponding to graphical user interface (GUI) icons, employing even less space in memory, resulting in use of the clusters of the file system being even more inefficient.

It will be appreciated that files that are larger than the size of a cluster (data cluster) or block (block as physical record) used in the given data filing system cause slack space, because the actual content of a given file is rarely equal to the last cluster (data cluster) or block (block as physical record) reserved for the given file; in other words, files that are larger than the size of a cluster are rarely precisely of a size which is exactly an integer multiple of the size of the cluster. However, the more clusters (data clusters) or blocks (blocks as physical record) that are present in the file, the relatively less physical slack space is created in the data filing system when storing data therein.

Various known methods of storing data into data memory, and subsequently accessing the stored data, are described in following published patent application documents:
US2011/0035557 A1 (Luukkainen et al.);
US2011/0040795 A1 (Gordon et al.);
US02013/0111182 A1 (Aslot et al.);
US2009/0112951 A1 (Ryu et al.);
US2011/0106806 A1 (Tamas et al.); and
US2005/0160309 A1 (Golding et al.).

In a published United States patent document US20080270461 A1 (Colin Stebbins Gordon; "Data containerization for reducing unused space in a file system"), there is described an apparatus and method for containerization of multiple data objects within a block of a single container. The apparatus and method is configured to pack multiple data objects together in a block of a logical container in a file system. The method includes receiving data in a form of multiple data objects to be stored in a file system, and collectively data packing the multiple data objects together in at least one block of a logical container in the file system. The block is a fundamental unit of storage space of the file system, and each block of the logical container includes multiple extents to store data from at least one data object of the multiple objects. The apparatus includes a plurality of storage devices coupled to a storage server. The storage server is configured to store the multiple data objects in at least one block of the logical container in the file system. Some data objects are stored in multiple extents of one or more blocks depending upon the size of the data object.

SUMMARY

The present disclosure seeks to provide a more efficient method of storing data, for example data content objects, in data memory that is managed by a filing system as clusters or blocks.

The data content objects are beneficially icons representing different functional options, for example in a portable electronic device, but could also be other types of data such as data files, text data, audio data, image data, binary data and measurement data.

Moreover, the present disclosure seeks to provide an electronic device, for example a portable electronic device, that is operable to employ more efficient data storage, for example more efficient data storage of data content objects, in data memory that is managed by a filing system as clusters or blocks.

According to a first aspect, there is provided a method of operating a data memory of a device that is managed by a filing system that is operable to store data in respect of one or more clusters or blocks within the data memory, characterized in that the method includes:
(a) assembling together a plurality of data content objects into a virtual container;
(b) storing the virtual container (150) and its associated data content objects (110, 60) into one or more of the one or more clusters or blocks (100), wherein the data content objects (110, 60) are memory-aligned within the one or more clusters or blocks, wherein cluster or block size is hierarchical such that the one or more clusters or blocks (100) include smaller clusters or blocks with room enough for one or more data content objects smaller than a pre-defined size of a cluster and larger clusters or blocks for data content objects larger than a pre-defined size of a cluster, wherein smaller and larger clusters or blocks are used to do suitable alignment to the data content objects (110,60) based on needs of the used filing system; and
(c) selectively accessing an individual data content object from the plurality of data content objects (110, 60) in the virtual container (150) stored within the data memory (40);
wherein limits of the one or more clusters or blocks (100) are crossed by one data content object (110) of the one or more clusters or blocks if the size of that data content object (110) is larger than a cluster or a block whereat it is stored.

The present disclosure is of advantage in that there is provided a novel way of storing files into memory in an optimal format, for example, that is memory-aligned, thus enabling near-maximal utilization of a theoretical memory capacity of data storage memory, independently on which particular type of file system is used for managing the data storage memory.

Optionally, the method includes selectively accessing the individual data content object from the plurality of data content objects having mutually different file formats.

Optionally, in the method, the plurality of data content objects have mutually different file formats.

Optionally, the method includes the method includes assembling together data content objects smaller than a cluster and last blocks of data content objects larger than a cluster within the one or more clusters or blocks.

Optionally, the method includes transcoding one or more of the data content objects when storing and/or accessing them from their virtual container stored in the data memory. Transcoding involves changing a structure and/or a format of given data, for example.

Optionally, the method includes compressing, encrypting, decompressing or decrypting one or more of the plurality of data content objects when storing and/or accessing them from their virtual container stored in the data memory.

Optionally, the method includes arranging for at least one of the plurality of data content objects to include a link to an external database relative to the data memory.

Optionally, in the method, the plurality of data content objects corresponds to data for generating one or more icons for presentation via a graphical user interface (GUI).

According to a second aspect, there is provided a device including a data memory that is managed by a filing system that is operable to store data in respect of one or more clusters or blocks within the data memory, characterized in that the device is operable:
(a) to assemble together a plurality of data content objects into a virtual container;
(b) to store the virtual container (150) and its associated data content objects (110, 60) into one or more of the one or more clusters or blocks (100), wherein the data content objects (110, 60) are memory-aligned within the one or more clusters or blocks, wherein cluster or block size is hierarchical such that the one or more clusters or blocks (100) include smaller clusters or blocks with room enough for one or more data content objects smaller than a pre-defined size of a cluster and larger clusters or blocks for data content objects larger than a pre-defined size of a cluster, wherein smaller and larger clusters or blocks are used to do suitable alignment to the data content objects (110,60) based on needs of the used filing system; and
(c) to access selectively an individual data content object from the plurality of data content objects (110, 60) in the virtual container (150) stored within the data memory (40);
wherein limits of the one or more clusters or blocks (100) are crossed by one data content object (110) of the one or more clusters or blocks if size of that data content object (110) is larger than a cluster or a block whereat it is stored.

Optionally, the device is operable to access selectively the individual data content object from the plurality of data content objects having mutually different file formats.

Optionally, the device is operable to move together data content objects (110) smaller than a cluster and last blocks of data content objects (110) larger than a cluster within the one or more clusters or blocks (100).

Optionally, the device is operable to transcode one or more of the plurality of data content objects when storing and/or accessing them from their virtual container stored in the data memory.

Optionally, the device is operable to compress, encrypt, decompress or decrypt one or more of the plurality of data content objects when storing and/or accessing them from their virtual container stored in the data memory.

Optionally, the device is operable to arrange for at least one of the plurality of data content objects to include a link to an external database relative to the data memory.

Optionally, when the device is in operation, the plurality of data content objects corresponds to data for generating one or more icons for presentation via a graphical user interface (GUI) of the device.

Optionally, the device (10) is a portable electronic device.

According to a third aspect, there is provided a computer program product comprising a non-transitory computer-readable storage medium having computer-readable instructions stored thereon, the computer-readable instructions being executable by a computerized device comprising processing hardware to execute a method pursuant to the first aspect.

It will be appreciated that features of embodiments of the disclosure are susceptible to being combined in various combinations without departing from the scope of the invention as defined by the appended claims.

DESCRIPTION OF THE DIAGRAMS

Embodiments of the present disclosure will now be described, by way of example only, with reference to the following diagrams wherein.

Figure 3A:
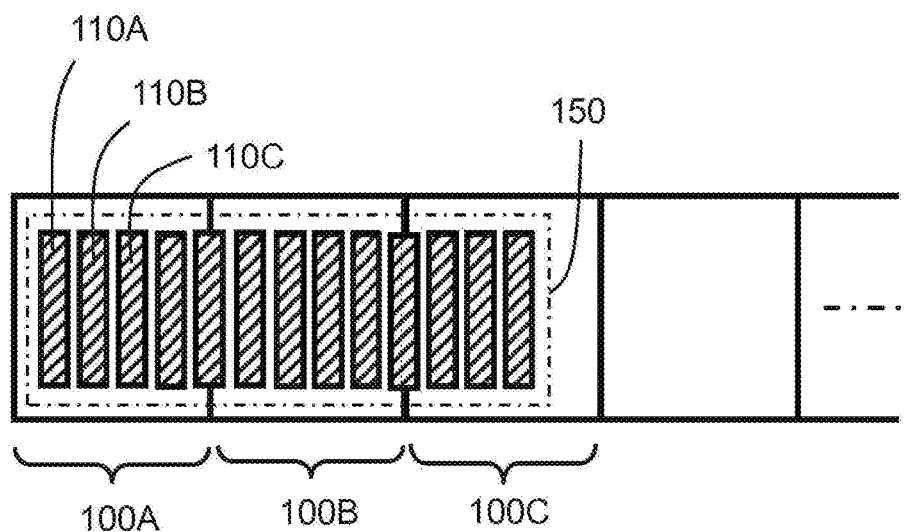
FIG. 3A is an illustration of data content object storage in virtual containers pursuant to an embodiment of the present disclosure.
Figure 3B:
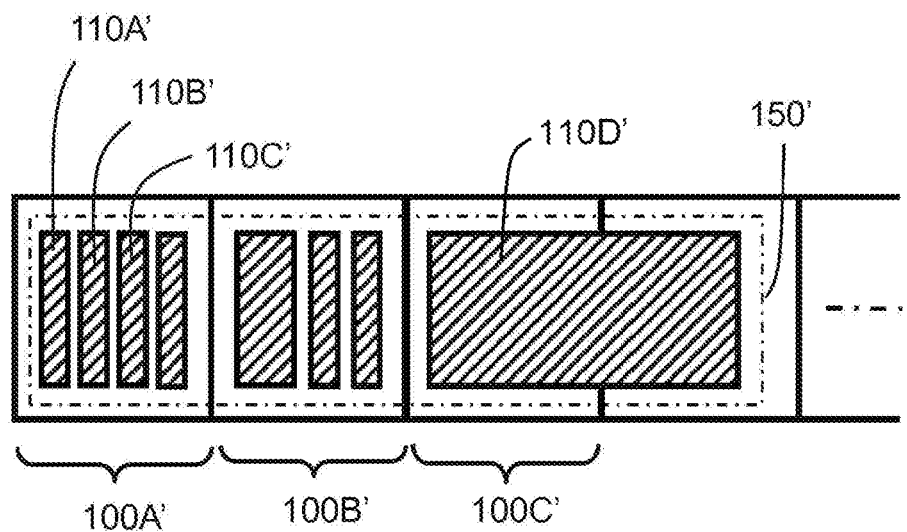
FIG. 3B is an illustration of data content object storage that contains several portions of data inside one cluster in virtual containers pursuant to an embodiment of the present disclosure; the limits of the clusters are not crossed by one portion of data, unless the size of that particular portion of data is not itself larger than the cluster.
Figure 3C:
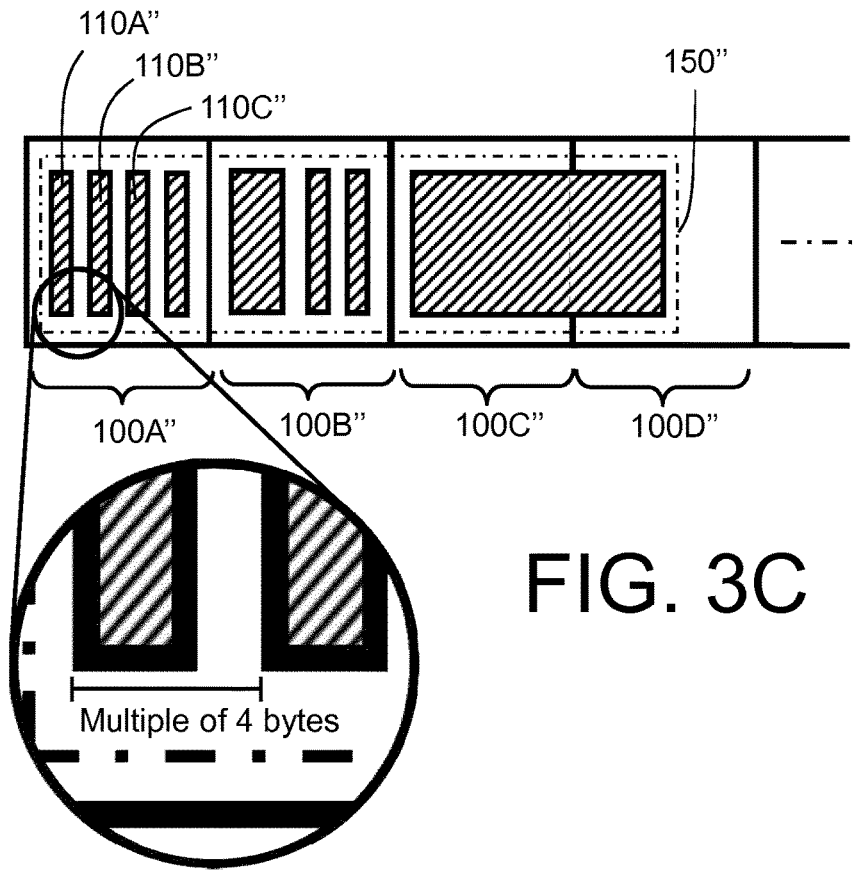
Figure 3D:
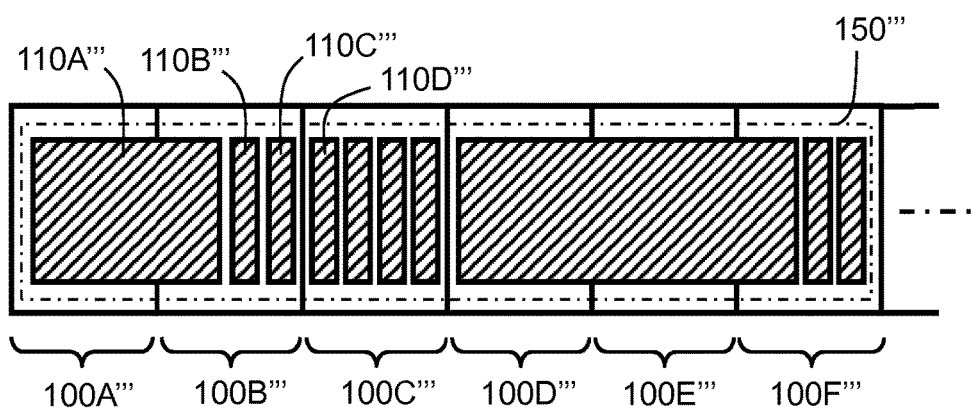
Figure 3E:
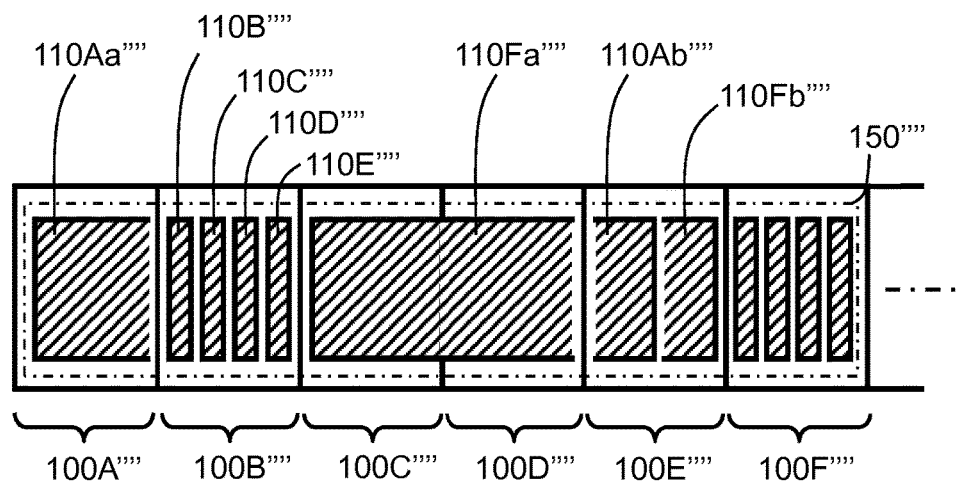
Figure 3F:
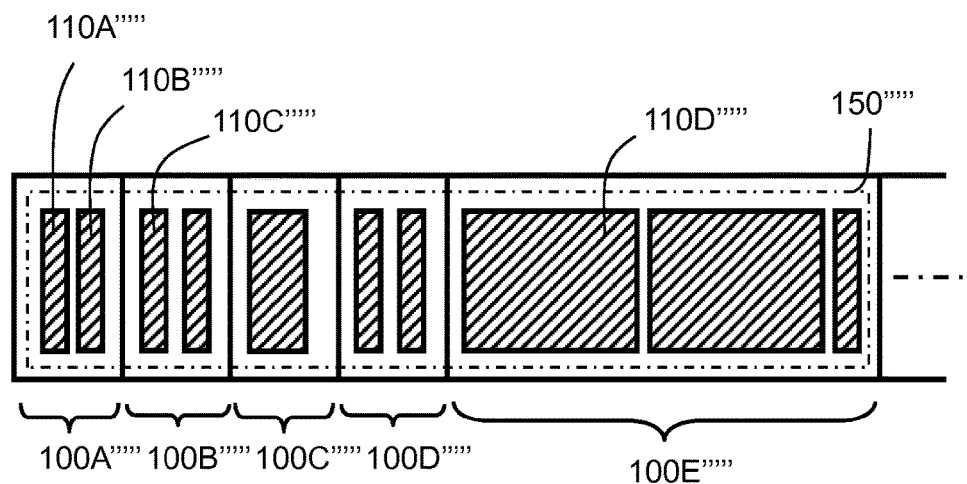

FIG. 3C is an illustration of data content object storage that contains several portions of data inside one cluster in virtual containers pursuant to an embodiment of the present disclosure; the limits of the clusters are not crossed by one portion of data unless the size of that particular portion of data is not itself larger than the cluster where it is stored; FIG. 3C differs from FIG. 3B by having the portions of data aligned not with byte precision, but instead with alignment precision, so that the memory addresses are, for example, 4-byte aligned, 8-byte aligned or 16-byte aligned, which is capable of optimizing an associated management portion (for example, such alignment precision corresponds to a precisions of a plurality of a relatively small number of bytes, for example in a range of 4 to 16 bytes);

FIG. 3D is an illustration of a manner in which other files can be added to a last cluster, in addition to end portions of large files;

FIG. 3E is an illustration of data content object storage that contains several portions of data inside one cluster in virtual containers pursuant to an embodiment of the present disclosure; FIG. 3E depicts a manner in which an end portion of one large file has been moved into a same cluster with an end portion of another large file. Alternatively, small files can be used instead of the end portions of large files to fill the cluster;

FIG. 3F is an illustration of data content object storage where there are several smaller clusters with room enough for one or more portions of data and also larger clusters for larger portions of data; there is illustrated a manner in which one large cluster can be divided hierarchically, for example into four smaller clusters, that can then be divided further into smaller clusters.

Figure 3G:
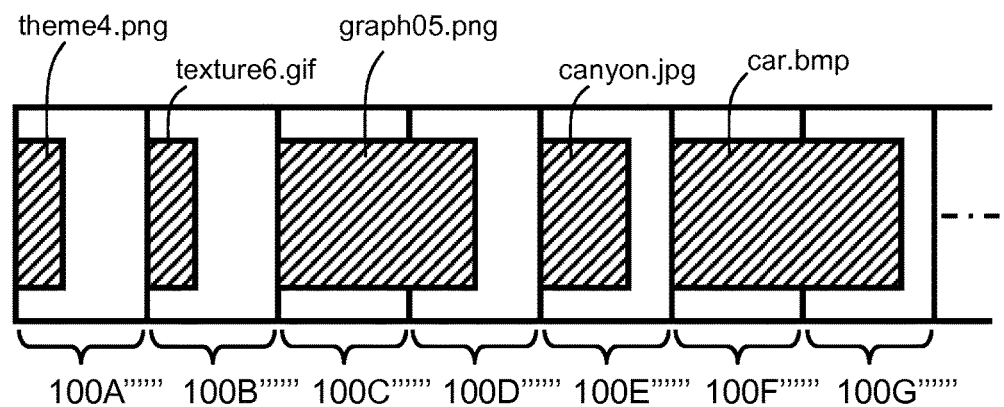
Figure 3H:
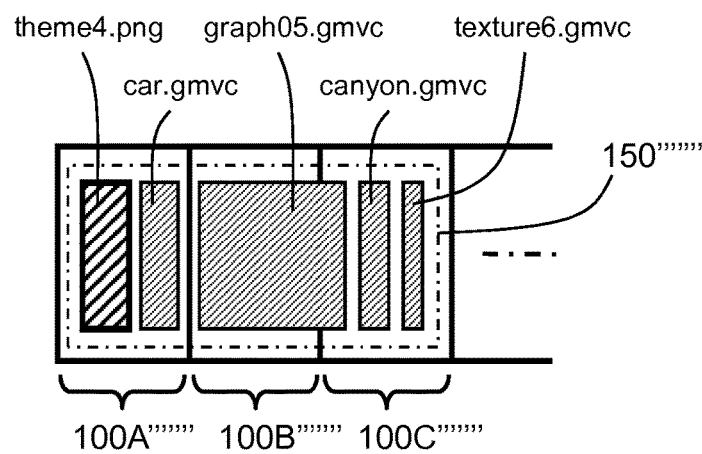
Figure 3I:
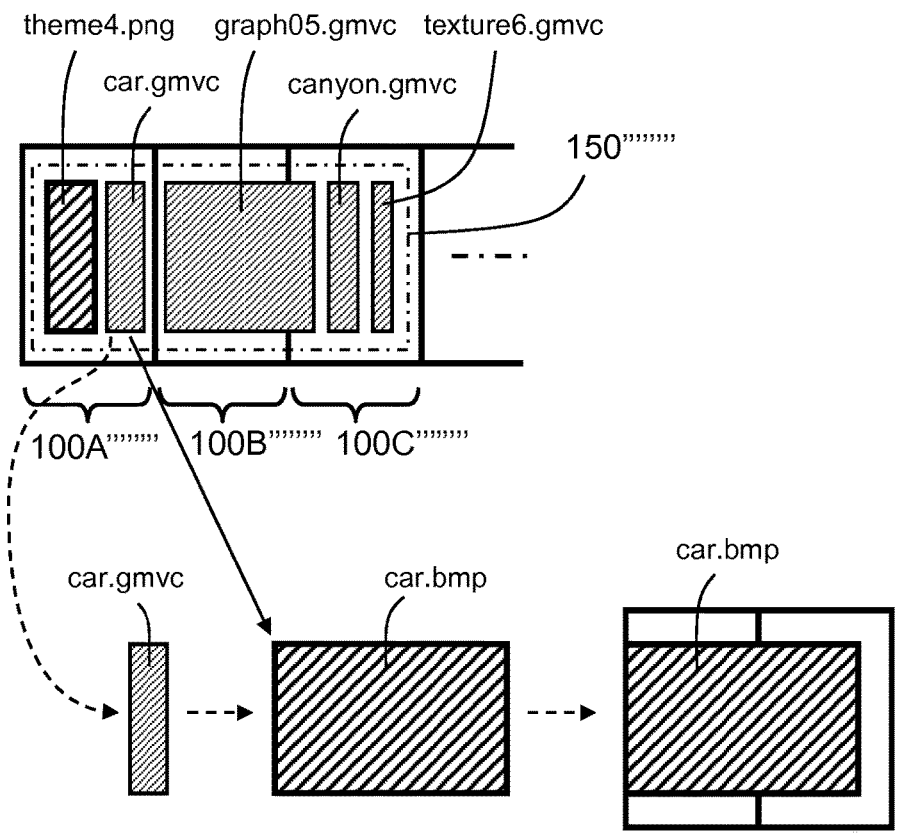
Figure 4:
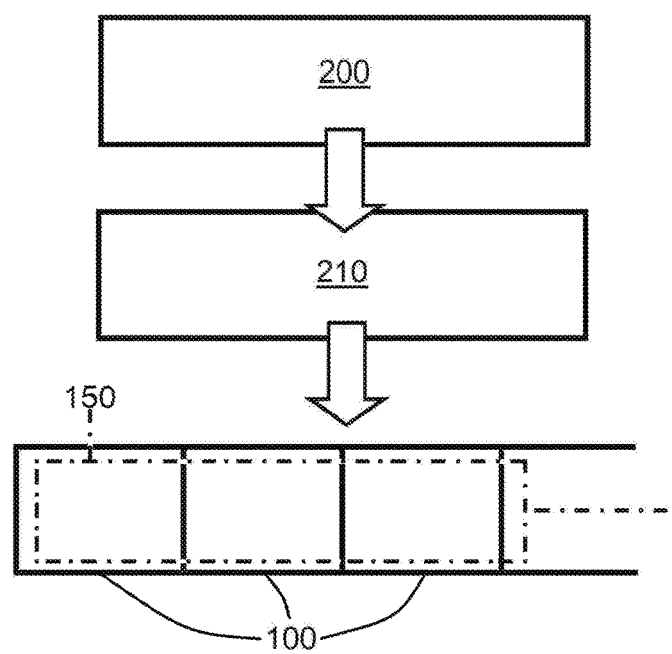
Figure 5A:
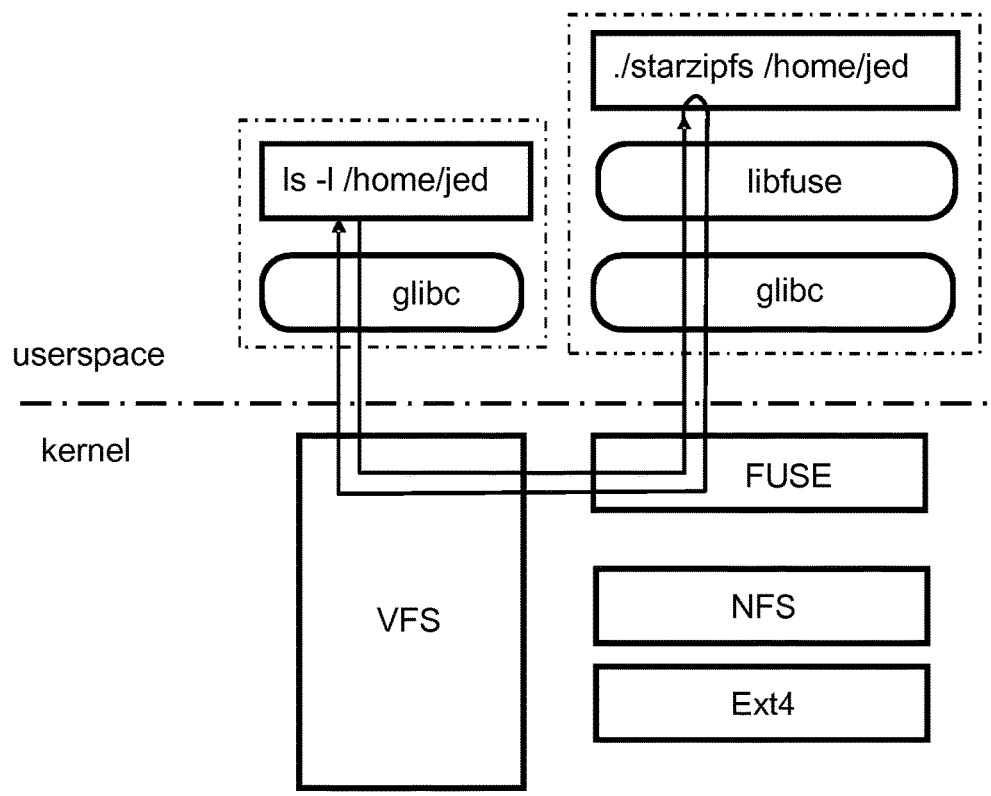
Figure 5B:
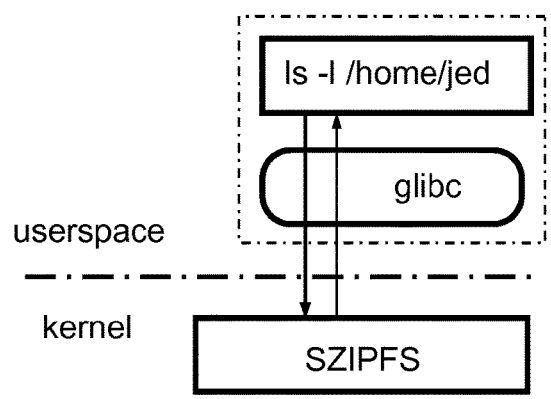

FIG. 3G is an illustration of data content object storage that contains several portions of data inside clusters; FIG. 3G presents a situation wherein several large and small image files have been inserted into clusters; a lot of empty space remains in some clusters, whereas some files do not fit into one cluster;

FIG. 3H is an illustration of a manner in which the same files that are illustrated in FIG. 3G have been compressed and inserted into three clusters so that the first cluster contains small files and a large file that begins in the second cluster continues into the next cluster;

FIG. 3I is an illustration of the same files and clusters as illustrated in FIG. 3H, but in FIG. 3I, a file 'car.gmvc' is currently being read;

FIG. 4 is an illustration of implementing an additional filing system hierarchy for achieving storage of a plurality of data content objects in an efficient manner in data memory that is organized as clusters or blocks, for example clusters or blocks of fixed pre-determined size;

FIG. 5A is an illustration of an embodiment pursuant to the disclosure, namely a virtual filing system pursuant to the disclosure, implemented by using FUSE, wherein a virtual file system SZIPFS is operable to function in user space; and FIG. 5B is an illustration of an embodiment pursuant to the disclosure, namely a virtual file system implemented as an independent filing system, wherein the virtual file system SZIPFS is located in kernel space.

It will appreciated that aligning the portions of data by alignment precision instead of byte precision can be used in all embodiments of the present disclosure. The term "alignment" as used within the present disclosure indicates that the data content objects inside clusters are memory-aligned so that their memory addresses are N-byte aligned, where N is a power of two, namely $2^n$. Therefore, the magnitude of the alignments is a few bytes. The term alignment in this application does not refer to alignment of cluster sizes.

In the accompanying diagrams, an underlined number is employed to represent an item over which the underlined number is positioned or an item to which the underlined number is adjacent. A non-underlined number relates to an item identified by a line linking the non-underlined number to the item. When a number is non-underlined and accompanied by an associated arrow, the non-underlined number is used to identify a general item at which the arrow is pointing.

DESCRIPTION OF EMBODIMENTS OF THE INVENTION

In overview, according to a first aspect, there is provided a method of operating a data memory of a device that is managed by a filing system that is operable to store data in respect of one or more clusters or blocks within the data memory, characterized in that the method includes:

(a) assembling together a plurality of data content objects into a virtual container;
(b) storing the virtual container and its associated data content objects into one or more of the one or more clusters or blocks, wherein the data content objects are memory-aligned within the one or more clusters or blocks, wherein cluster or block size is hierarchical such that the one or more clusters or blocks (100) include smaller clusters or blocks with room enough for one or more data content objects smaller than a pre-defined size of a cluster and larger clusters or blocks for data content objects larger than a pre-defined size of a cluster, wherein smaller and larger clusters or blocks are used to do suitable alignment to the data content objects (110, 60) based on needs of the used filing system; and
(c) selectively accessing an individual data content object from the plurality of data content objects (110, 60) in the virtual container (150) stored within the data memory (40);
wherein limits of the one or more clusters or blocks (100) are crossed by one data content object (110) of the one or more clusters or blocks if the size of that data content object (110) is larger than a cluster or a block whereat it is stored.

Optionally, the method includes selectively accessing one or more of the plurality of data content objects from the virtual container stored within the data memory.

Optionally, in the method, the plurality of data content objects have mutually different file formats.

Optionally, the method includes transcoding one or more of the data content objects when storing and/or accessing them from their virtual container stored in the data memory.

Optionally, the method includes compressing, encrypting, decompressing or decrypting one or more of the data content objects when storing and/or accessing them from their virtual container stored in the data memory.

Optionally, the method includes arranging for at least one of the plurality of data content objects to include a link to an external database relative to the data memory.

Optionally, in the method, the plurality of data content objects corresponds to data for generating one or more icons for presentation via a graphical user interface (GUI).

According to a second aspect, there is provided a device including a data memory that is managed by a filing system that is operable to store data in respect of one or more clusters or blocks within the data memory, characterized in that the device is operable:

(a) to assemble together a plurality of data content objects into a virtual container;
(b) to store the virtual container and its associated data content objects into one or more of the one or more clusters or blocks, wherein the data content objects are memory-aligned within the one or more clusters or blocks, wherein cluster or block size is hierarchical such that the one or more clusters or blocks (100) include smaller clusters or blocks with room enough for one or more data content objects smaller than a pre-defined size of a cluster and larger clusters or blocks for data content objects larger than a pre-defined size of a cluster, wherein smaller and larger clusters or blocks are used to do suitable alignment to the data content objects (110,60) based on needs of the used filing system; and
(c) to access selectively an individual data content object from the plurality of data content objects (110, 60) in the virtual container (150) stored within the data memory (40);
wherein limits of the one or more clusters or blocks are crossed by one data content object of the one or more clusters or blocks if the size of that data content object is larger than a cluster or a block whereat it is stored.

Optionally, the device is operable selectively to access one or more of the plurality of data content objects from the virtual container stored within the data memory.

Optionally, when the device is in operation, the plurality of data content objects have mutually different file formats.

Optionally, the device is operable to transcode one or more of the data content objects when storing and/or accessing them from their virtual container stored in the data memory.

Optionally, the device is operable to compress, encrypt, decompress or decrypt one or more of the data content objects when storing and/or accessing them from their virtual container stored in the data memory.

Optionally, the device is operable to arrange for at least one of the plurality of data content objects to include a link to an external database relative to the data memory.

Optionally, when the device is in operation, the plurality of data content objects corresponds to data for generating one or more icons for presentation via a graphical user interface (GUI) of the device.

According to a third aspect, there is provided a computer program product comprising a non-transitory computer-readable storage medium having computer-readable instructions stored thereon, the computer-readable instructions being executable by a computerized device comprising processing hardware to execute a method pursuant to the first aspect.

When describing embodiments of the present disclosure in the following, abbreviations are employed as provided in Table 1:

TABLE 1 details of acronyms employed to describe embodiments

| Acronym | Detail |
| --- | --- |
| Block | A physical record, the smallest logical amount of disk space that can be allocated to hold a file. |
| Cluster | A data cluster is the smallest logical amount of disk space that can be allocated to hold a file. |
| NFS | Network File System. |
| NVM | Non-volatile memory: computer memory that can retrieve stored information even after having been power cycled (turned off and back on), e.g. hard disk, magnetic tapes, etc. |
| RAM | Random Access Memory |
| ROM | Read Only Memory |
| Slack space | Wasted disk space (for example, unused disk space). |
| SSD | Solid State Drive: a solid-state storage device that uses integrated circuit assemblies as memory to store data persistently. |
| VFS | Virtual File System. |
| SZIP | Starzip image file. |

In overview, embodiments of the present disclosure are suitable, for example, in fields of utilization, namely "ecosystems", of the mobile devices and corresponding embedded devices. These ecosystems and their corresponding devices comprise, or depend upon, a considerable amount of files whose size is smaller than a pre-defined fixed-size cluster, namely "data cluster", or block, namely "block as physical record". The embodiments of the present disclosure also apply to "block devices", namely where data memory is managed in terms of data blocks.

The methods described in respect of embodiments of the present disclosure make it possible to store and include considerably more files than known, namely "prior art", systems are capable of accommodating. Moreover, embodiments of the present disclosure make it possible for device manufacturers to produce more competitive, cheaper and more cost-efficient hardware.

Embodiments of the present disclosure are capable of achieving a maximal cost-efficiency in data storage capacity, especially regarding small files that are smaller in size than a cluster (data cluster) or block (block as physical record) defined in a file system. Thus, the embodiments of the present disclosure are capable of saving considerable amounts of physical memory, namely a performance characteristic that can be important in aforementioned ecosystems and in embedded systems.

Moreover, the present disclosure provides a method of storing data which enables a user to achieve more efficient content compression and encryption and, if necessary, backup copying, for example into another file system or into a centralized data-storage cloud. Therefore, a decoder integrated in a data storage system pursuant to the present disclosure is able to decompress the contents of a file for the user, even if the file were compressed and encrypted. An encoder integrated in the aforementioned data storage system enables transcoding a file from one format into another; namely, a file system in a digital "ecosystem" can then request, for example, a .bmp image file in the .png format, in which case the file is decoded from its original format and re-encoded into the format indicated by a file extension of a link.

Embodiments of the present disclosure can be implemented so that they are compatible with a file system that is most commonly used in ecosystem, thereby not endangering data security in the system and not interfering with its associated user permissions.

Embodiments of the present disclosure differ from known prior art systems in that they are capable of using a file in a more optimized fashion, for example improved fashion, directly from an optimized data container that is located in a same physical non-volatile memory, thus not needing to make changes into programs or scripts that use the file; such optimization is advantageously utilized in a portable electronic device including therein data memory, wherein data stored in the data memory is utilized by the device when in operation.

Embodiments of the present disclosure are technically different from known systems of file management for portable electronic devices. For example, in reference [3], there are produced tailored optimal-sized sequences of data that are incorporated into fixed-sized packets according to their priority and based upon their data format, thereby preventing occurrence of wasted space in the data packets being produced. In contradistinction, embodiments of the present disclosure focus instead on content which has an actual size that is a lot smaller, for example less than 50%, more optionally less than 25%, than the size of a cluster (data cluster) or block (block as physical record) used in a given particular file system, wherein such content contemporarily results in slack memory space, namely in an inefficient use of memory capacity. Embodiments of the present disclosure are not dependent upon priorities of data, and thus the embodiments of the present disclosure are capable of combining all mutually different kinds of data together. Of course, optionally, embodiments of the present disclosure can still also utilize priorities or assemble similar data contents together as well. Optionally, the embodiments can utilize the knowledge on how often the files are needed, namely how often they are read from memory.

Embodiments of the present disclosure address a technical problem of inefficient utilization of precious data memory in such situations, where the "ecosystems" provided by device manufacturers are based on known prior art data filing systems and are used so as to maintain compatibility of applications. In these known prior art file systems, the files are stored into one or more pre-formatted fixed-size clusters (data clusters) or blocks (blocks as physical record), thereby enabling a fairly capable and cost-efficient data filing system for reading and writing of medium-sized, and larger than medium-sized files; such known prior art file systems are described, for example, in reference [1]. By "medium-sized files" is meant, for example, data files having a size in a range of, for example, from 4 kByte to 1 MByte; by "larger than medium-sized files" is meant, for example, data files having a size greater than, for example 1 MByte.

A simple example of such a known prior art file system is as follows: when a file whose size is one byte is stored into a file system where the size of a cluster (data cluster) or block (block as physical record) is by default 4096 bytes, then a hardware non-volatile memory, for example see reference [2], wastes 4095 bytes, namely 99.98%. Such wastage corresponds to gross inefficiency in data storage.

In a given data filing system, the amount of wasted bytes can always be computed when both the size of the file in bytes and the size of a cluster, namely "a data cluster", or block, namely "block as physical record", used in that particular file system are known. A principal increase in cost-efficiency that embodiments of the present disclosure yield is gained in such file systems where the operating system consists of files smaller than aforementioned medium-sized files, that in known prior art data filing systems operate to cause considerable slack space in hardware non-volatile memories.

For example, the Android® operating system uses tens of thousands of images, logos and icons that must be stored in fast non-volatile memories so that they can be loaded fast into Random Access Memory (RAM) of a portable electronic device. Therefore, the majority of such images, logos and icons are smaller in size, namely smaller in number of bytes, than the pre-defined size of a cluster, namely "a data cluster", or block, namely "block as physical record", used in that particular file system, because these files are originally small or they have been compressed maximally to fit their purpose in the portable electronic device.

Embodiments of the present disclosure are operable to enable removal of slack space in memory; when the embodiments are employed in known prior art file systems such as:
Ext3, Ext4, NTFS, FAT, NFS, VFS, and similar,
used in several known operating systems:
iOS, Android, OS X, Linux, BSD, Windows, and similar,
a considerable increase in memory usage efficiency is susceptible to being achieved. "Ext3", "Ext4", "NTFS", "FAT", "NFS", "VFS", as well as "iOS", "Android", "OS X", "Linux", "BSD", and "Windows" include registered trademarks.

In the following, several embodiments of the present disclosure will be described. These embodiments are all based on moving all such files that are smaller, originally or after compression, than the pre-defined size of a cluster (data cluster) or block (block as physical record) into an optimized data container, that however is located physically in the same non-volatile memory as the files. More specifically, at least a last cluster of such files needs to be smaller than a pre-defined size of a cluster, namely "a data cluster", or block, namely "block as physical record", or at least small enough, as will next be described.

In embodiments of the present disclosure, a small file or a last cluster, namely "a last data cluster", or block, namely "block as physical record", of a larger file reserves only as many bytes or bits of memory as it needs and thus does not reserve unnecessary slack space from the non-volatile memory. However, it will be appreciated that there is no need to move other than the small files and/or the last clusters of those larger files mentioned above together, so as to enable a fast and easily implementable technical solution. Of course, for example, an entire data content of larger files can also be moved together so that the data content will be in a row. Sometimes, the clusters are moved only when the amount of bytes saved is at least some predefined size; for example, a predefined size of 0.5 kB when 4 kB clusters are used. Such a minimum size rule is optionally employed so as to avoid a non-necessary (i.e. unnecessary) combination of clusters that do not remove enough slack space in data memory. It is also optionally possible to move those last clusters together, so that another, more accurate clustering can be used; for example 0.5 kB clusters are used with 4 kB original clusters. This means that the cluster size is hierarchical, which makes it possible to remove large sections of slack space, although not as much as the maximum savings that can be achieved by using clusters with 1 byte accuracy. Moreover, other cluster sizes can be used, for example smaller and larger, but typically the selected cluster size or cluster sizes should be selected so that they do suitable alignment to the stored data compared to non-aligned 1 byte (8-bit) clusters based on the needs of the used system, for example 32/64/128-bit or 512/1024-byte.

In embodiments of the present disclosure, physical data files can be replaced by links, for example in a manner as described in reference [4], that optionally point to an optimized data container. Moreover, in the embodiments, physical files can be moved to one or more optimized data containers that, with regard to the data filing system, are created as virtual files, as a device or as parallel data filing systems. The clusters, namely "data clusters", or blocks, namely "blocks as physical record", reserved by files moved in this way are set free in the data filing system and they are technically copied into clusters, namely "data clusters", or blocks, namely "blocks as physical record", reserved by an optimized data container in the same non-volatile memory. Embodiments of the present disclosure are optionally also used for volatile memories, when they are also read using a filing system access. Typically those volatile memories are not read using a filing system access.

Embodiments of the present disclosure make it possible to achieve a cost-efficient technical solution in many different operating systems, for example in portable electronic devices as aforementioned, thereby paying attention to the user permissions and other important basic functionalities of a data filing system. It will be appreciated that the data filing system pursuant to the disclosure, also known as a "file system", can also function as an independent filing system just like the contemporary filing systems, and is susceptible to being implemented at a hardware level or as a software driver, or a combination of a hardware level and a software driver, but resulting in even better overall data storage efficiency and enhanced data storage capacity for given memory.

On the other hand, embodiments of the present disclosure are concerned with a software solution that enables integration into an existing data filing system software that can be executed both in an administrative mode, namely "admin mode", and in a user mode; with regard the user mode, reference [5] is concerned with "user space". If embodiments of the present disclosure are integrated into a kernel of an operating system, then it will become a part of the operating system, namely being executed with permissions of the operating system, as part of its associated kernel space. It is also possible to implement embodiments of the present disclosure in the kernel space that is run in the kernel of the operating system, if the files whose space usage is optimized need elevated permissions or are physically located in another memory, for example in a section of data memory reserved for firmware.

In certain operating systems, embodiments of the present disclosure can be implemented also as a background service, but in such a case it is a software application being executed in the operating system that is responsible for running the implementation and that is mounted, see reference [6], in the data filing system, namely "file system", as a virtual drive or as a virtual device; see reference [7] with regard to virtual file systems.

If it not possible to integrate embodiments of the present disclosure into a file system of a given operating system, either because of strict operating conditions set by an associated device manufacturer or because it would not otherwise be possible to implement technically, then the embodiments can still be implemented by using a network drive; network drives are described in reference [8] in respect of network file systems. However, a NFS-based system must be implemented in such a way that contents of a given optimized data container reserves drive space in the same file system.

Optionally, embodiments of the present disclosure can be implemented so that only such data files that have mutually similar permissions are moved together. Optionally, information about the file permissions are moved together with the files themselves, which makes it easier to restrict unauthorized usage of the data files, as associated administrator's desire.

When contemporary operating systems are principally based on *NIX systems, embodiments of the present disclosure are susceptible to being used for the Linux operating system, since such implementation can be adapted with minor changes, also on Android® and iOS® mobile platforms for example. "*NIX", "Android" and "iOS" are registered trademarks.

Regardless of which technical implementation is used, the files to be optimized need to be assembled into the data container. The data container can be a simple file or a database, such that embodiments of the present disclosure are beneficially used when:
 (i) data files are smaller than a cluster (data cluster) or block (block as physical record), wherein the data files are stored into the data container; and
 (ii) the last cluster or block of files larger than a cluster is stored into the data container; or
 (iii) the entire file is stored into the data container, which is located physically on a data storage drive/disk as the optimized files.

A very simple solution pursuant to the present disclosure is a virtual file that has the size of one file which simulates compatibility with the existing file system. However, this virtual file in itself comprises an optimal way to store files without the current prior art limitation of having a minimum size for a cluster (data cluster) or block (block as physical record). Such a functionality can be implemented, for example, by using a proprietary FUSE program, described in reference [11], which offers a simple interface for user space applications for exporting a virtual file system to the Linux kernel. An example of a virtual filing system pursuant to the disclosure, implemented by using FUSE (Filesystem in User Space) is illustrated in an upper box of FIG. 5A, wherein a virtual file system SZIPFS is operable to function in a user space, so that FUSE executes software code that needs elevated kernel space privileges. A command used is 'ls –l/home/jed', which is used to provide a detailed list of files in a directory '/home/jed' that maps to the virtual filing system, using a starzipfs computer program that employs embodiments of the present disclosure and thus lists the files there as if they were in '/home/jed'.

Next, there will be provided an explanation on how such a virtual file system is implemented as an independent filing system comparable to, for example, 5 Extent and NFS (see reference [8]). Such a scenario is illustrated in FIG. 5B, wherein SZIPFS is located in a kernel space. In such a scenario, mounting SZIPFS needs elevated privileges. SZIPFS employs a filing system that needs to be created using admin permissions, but a user is able thereafter to use corresponding SZIPFS disk space with methods pursuant to the present disclosure, as if it were, for example, an EXT4 journaling file system.

In an example embodiment of the present disclosure, the initialization, mounting and usage of a virtual file system is simple and easy technically, by giving commands in two phases. It will be appreciated that such a procedure can also be automated and configured in an '/etc/fstab' file, for example as described in reference [12]. Following steps are thus executed:
(i) creating a mount point directory for an optimal data container, for example by giving a command: mkdir/mnt/szip; and
(ii) linking the optimal data container to the directory being used, for example by giving a command: ./starzipfs/home/jed/mnt/szip.

In such an implementation, applications and/or libraries have an option to overwrite directly standard input/output operations (I/O) of file handling, such as following C functions:
fopen, fseek, fread, fwrite, fclose
but not limited thereto. This option enables pointing/linking to a file inside an optimized data container, instead of pointing/linking directly to a file. The described implementation is optimal if the optimized data container is used only for a certain solution or application, and there is therefore no need to make changes into an associated operating system such as to modify user permissions, or to install and/or start software programs necessary for implementing a service, something that needs to be done, for example, when implementing a data filing system using aforementioned FUSE.

It is also optionally possible, pursuant to the present disclosure, to overwrite standard I/O functions of file handling:
(a) in advanced programming language software code, in which case such changes affect only the application and/or library internally; or
(b) in the application Programming Interface (API) of the operating system, in which case the changes may also affect external applications and/or libraries.

It will be appreciated that, with embodiments pursuant to the present disclosure, there is no need to overwrite I/O functions of file handling if files of the optimized data container are used, in which case a programmatic interface provided by the optimized data container can be used directly.

In a recent 2015-08 version of the Android® operating system (OS), namely open source software as described in reference [9], there are included 22834 images, namely icons, logos and other graphics that are installed into a file system of devices along with the operating system (OS); "Android" is a registered trademark. These images are used in the construction of a principal user interface, namely a principal graphical user interface (GUI). There will next be described two examples in which it is assumed that image files are stored into a physical solid state drive (SSD) memory whose block size is by default 4096 bytes; with regard to SSD, see reference [10]. Moreover, in the examples, the files are stored as PNG images.

In a first example pursuant to the present disclosure, all such images are selected whose size in bytes, namely their actual size, is either of a mutually same size as that of the cluster (data cluster) or block (block as physical record), or smaller than that, namely all together 17846 PNG files. The content of these files all together is 19982717 actual bytes, but they reserve 73097216 bytes on disk, which means that using embodiments of the present disclosure releases a total of 53114499 bytes of slack space to be used more productively, namely 72.66%, which is a considerable improvement as regards utilization of physical memory.

In the second example pursuant to the present disclosure, all aforementioned images of the first example are selected, irrespective of their content size, namely all together 22834 PNG files. The content of these files all together is 283565760 actual bytes, but they reserve 347996160 bytes on disk, which means that using embodiments of the present disclosure is capable of releasing a total of 64430400 bytes to be used more productively, namely 18.51%.

In both the aforesaid first and second examples, it is possible to achieve a considerable improvement in data memory utilization.

It will be appreciated that if these files were to be compressed with, for example, a proprietary GMVC® codec, developed by Gurulogic Microsystems Oy, Finland, the GMVC® codec typically compressing approximately two times better that a contemporary PNG codec, then embodiments of the disclosure are capable of removing even more slack data file space, and thus even more disk space is saved for more productive use. Moreover, it will further be appreciated that even though these simplest examples receive a file in the PNG format and store it on disk in re-organized manner also in the PNG format, it is also possible to execute data format conversion as well in connection with the reading and the writing of the file, on condition that such a conversion can be performed fast enough so that it does not interfere with the user experience. Thus, for example, a PNG file can, in a solution pursuant to the present disclosure, first be converted into a .gmvc file which is then stored on disk using methods pursuant to the present disclosure. Then, as the user or the system desires to inspect the file, it can be read from the system as a PNG file, which means that the inverse conversion from GMVC to PNG format needs to be executed in connection with reading the file. Of course, the user or the system may potentially wish to read the file content in the .gmvc format, in which case the format conversion is not necessary in an associated data reading process.

Optionally, it is also possible that the user or the system is desirous to render an image on a device display from the file system, and in that case it is advantageous to execute associated transcoding directly from the .gmvc file into a BGRA or RGBA format, for example, namely without a need firstly to convert the file to .png format and then thereafter to a BGRA or RGBA format, which are directly usable at the input of the display device; such a situation is usually not the case with, for example, PNG or GMVC® formats.

Figure 1:
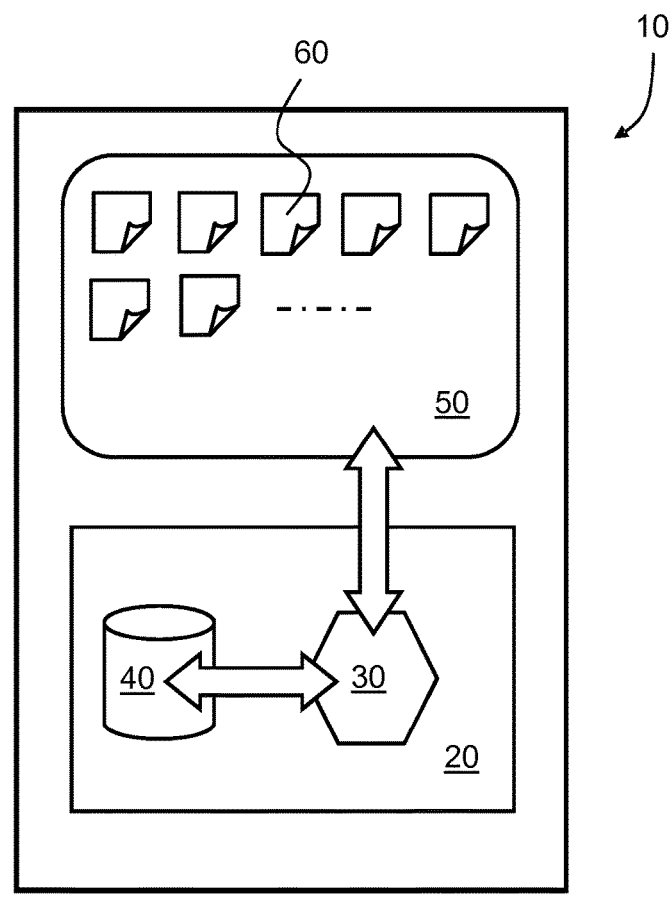
FIG. 1 is a schematic illustration of a portable electronic device that is operable to access its data memory pursuant to methods of the present disclosure, wherein the data memory is organized by its filing system in clusters or blocks.

Referring to FIG. 1, there is shown an illustration of a portable electronic device, for example a smart phone, a gaming terminal, a surveillance drone including on-board camera and image data storage (wherein efficient data storage is essential in an autonomous drone to achieve a low overall drone weight by reducing a mass of integrated circuits employed in the drone), a personal instrumentation device, a medical diagnostics device, a robotic device, a surveillance device (for example a body-mounted camera device and associated data logger), a satellite device, a space probe, a down-borehole monitoring probe for use in petrochemical industries (for example a bore-hole inspection device), or similar, indicated generally by 10. The portable electronic device 10 includes a data processing arrangement 20 including a data processor 30 and its associated data memory 40. Moreover, the data processing arrangement 20 is coupled to a graphic display arrangement 50 which is operable to provide a graphical user interface (GUI). Optionally, the GUI is implemented as a touch-screen. Optionally, the graphic display arrangement 50 is coupled wirelessly (for example via a proprietary G4 telephonic wireless communication link, wherein "G4" is a trademark) to the data processing arrangement 20, for example when the portable electronic device 10 is a remote surveillance drone that is required to stay air-borne for long periods when in operation and to record surveillance video, wherein the surveillance video is potentially in a series of brief video shoots whose data is smaller than a virtual container, cluster or block of the data memory 40 of the device 10.

In operation, data is stored in, and accessed from, the data memory 40, wherein the data processing arrangement 20 employs a data filing system, also known as a "file system", which organises the data memory 40 into clusters or blocks, as aforementioned. The data processing arrangement 20 is operable to execute one or more software applications, known as "Apps", for enabling the data processor arrangement 20 to perform one or more user-defined functions. In operation, one or more graphical symbols 60, known as "icons", are shown on the graphical user interface (GUI); data required for generating the one or more graphical symbols 60 are stored in the data memory 40, wherein data for a given graphic symbol 60 is stored in a corresponding given cluster of the data memory 40. The user is able to invoke the one or more software applications (Apps) by touching corresponding one or more graphical symbols 60 of the GUI, whereafter the one or more invoked software applications are executed on the data processor 30.

Figure 2:
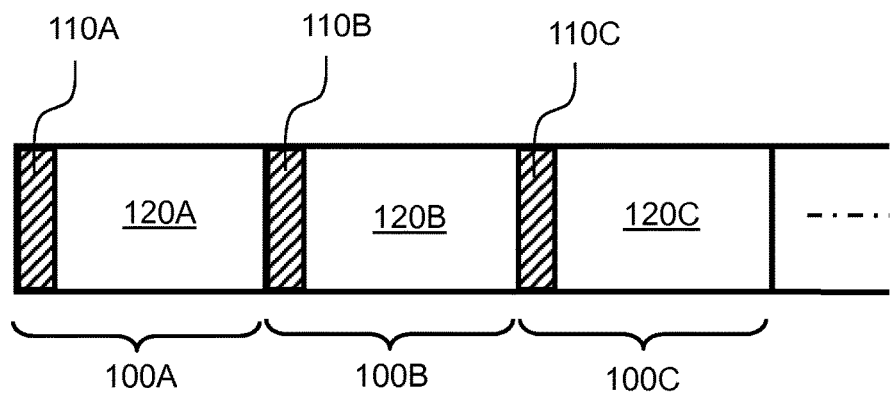
FIG. 2 is an illustration of data content object storage in clusters of a known data memory.

Referring next to FIG. 2, there is shown an illustration of a portion of the data memory 40 which is organized in a conventional manner by the aforementioned data filing system into clusters, denoted by 100A, 100B, 100C and so forth, wherein the clusters 100A, 100B, 100C are operable to have stored therein corresponding data 110A, 110B, 110C corresponding to the one or more graphic symbols 60, with corresponding slack spaces 120A, 120B, 120C. When the data 110A, 110B, 110C is considerably smaller in size to that of the clusters 100A, 100B, 100C respectively, the data memory 40 is utilized very inefficiently. Moreover, when data compression is employed to compress the data 110A, 110B, 110C within their respective clusters 100A, 100B, 100C, utilization of the data memory 40 becomes even more inefficient. This means that when compression is applied to data, it does not offer any benefit to the used memory space, for example disk space, when the amount of data is originally below the size of a cluster.

Referring next to FIG. 3A, embodiments of the present disclosure are operable to create an environment in which the data 110A, 110B, 110C are concatenated within a virtual container 150 which is then stored in one or more of the clusters 100A, 100B, 100C with relatively little slack data space in the data memory 40, representing a considerable improvement in utilization of the data memory 40, despite the data memory 40 and its associated filing system continuing to manage the data memory 40 in terms of clusters 100. An advantage of such an approach is that applying compression to the data 110 in the virtual container 150 is capable of further improving utilization of the data memory 40, in contradistinction to known filing systems employing clusters not benefiting from such compression, as aforementioned. Despite the data 110 being concatenated into the clusters 100 as illustrated in FIG. 3, embodiments of the present disclosure provide for the data 110 within the container to be searchable and extractable, for example for generating one or more of the graphical symbols 60.

Referring next to FIG. 3B, embodiments of the present disclosure are operable to create an environment in which several portions of data 110A', 110B', 110C' are stored inside one cluster in virtual containers pursuant to an embodiment of the present disclosure. The limits of the clusters are not crossed by one portion of data 110D' unless the size of that particular portion of data 110D' is itself larger than the cluster 100C' whereat it is stored, as is indeed the case with the portion of data 110D' as shown.

Referring next to FIG. 3C, a scenario depicted therein is otherwise similar to that of FIG. 3B, but in FIG. 3C, the portions of data are not aligned with byte precision, but instead with aforementioned alignment precision, so that memory addresses used are for example 4-byte-aligned, 8-byte aligned or 16-byte aligned, which optimizes the management portion. It will be appreciated that, for the enlarged portion of FIG. 3C, 4-byte alignment is used. However, embodiments of the present disclosure are optionally implementable with other alignment precisions, wherein the alignment precisions are to a plurality of bytes.

It will be appreciated that aligning the portions of data by alignment precision instead of byte precision can be used in all embodiments of the present disclosure.

Referring next to FIG. 3D, there is illustrated therein a manner in which other files can be added to a last given cluster, in addition to end portions of large files. Alternatively, optionally, the cluster containing the end portions of large files can be moved to another cluster, as depicted next in FIG. 3E. It will therefore be appreciated that clusters of large files have been filled, thereby. The last file in FIG. 3D has a size of 2.5 clusters; between the two large files, there is a cluster with several small files, that shows a manner in which in a solution with equal-sized clusters, files with many different sizes can be inserted, and still all clusters can be filled with either small files or with end portions of large files.

Referring next to FIG. 3E, there is illustrated therein a manner in which an end portion 110Ab"" of one large file 110Aa"" has been moved into a same cluster 110E"" with an end portion 110Fb"" of another large file 110Fa"". Alternatively, small files can be used instead of the end portions of large files to fill the cluster. It will be appreciated that it is beneficial, as regards data management, that the end portions of the large files are not separated from the rest of the file, even though they can optionally be separated; typically, the management of files is easier when end portions of the large files are not separated from the rest of the file.

Referring next to FIG. 3F, embodiments of the present disclosure are operable to create an environment in which there are several smaller clusters with room enough for one or more portions of data 110A'''', 110B'''', 110C'''' and also larger clusters for larger portions of data 110D''''. This kind of solution is well suited for cases where a memory-aligned scheme is desired, for example where a memory aligned scheme is desired that also employs hierarchical clustering. In FIG. 3F, there is provided an illustration of a manner in which one large cluster can be divided hierarchically for example into four smaller clusters, which can then be divided further into smaller clusters and so forth. Such hierarchical clustering is optionally implemented on a basis of at least one of:

(a) one or more temporal (i.e. time-defining) parameters describing data, for example a time at which that data is acquired from a sensor, for example from a surveillance camera;
(b) one or more parameters that indicate a relative importance of the data, for example a parameter that is indicative of whether or not a given 5 item of data is susceptible to being deleted to free up space in data memory in certain defined situations, for example in a situation of a memory purge, memory audit or similar;
(c) one or more parameters that indicate a type of the data (for example video 10 data, sensor data, audio data);
(d) one or more parameters that indicate ownership of the data (for example user data in contradistinction to data that is required for defining device operation, for example executable software that is required for maintaining device operation); and
(e) one or more parameters that indicate a priority order in which to data is to be communicated from the device to another device or database (for example via a wireless data link from a surveillance drone, surveillance camera or a surveillance robot).

By "at least one of" is used, for example, to indicate one of (a) to (e), alternatively any combination of (a) to (d), for example (a) and (b), for example (a) and (e), and so forth.

Referring next to FIG. 3G, there is illustrated a situation therein where several large and small image files have been inserted into clusters; some of the files were originally uncompressed (for example bitmaps), whereas some files were originally losslessly compressed image files (for example png, gif) and one file was originally compressed in a lossy manner (for example jpg). It can be seen in FIG. 3G a manner in which a lot of empty space remains in some clusters, whereas some files, such as a file named "graph05.png", do not fit into one cluster. As a result, data memory is not employed in an optimal manner.

Referring next to FIG. 3H, there is illustrated how the same files that were presented in FIG. 3G have been compressed with starzipfs and inserted into three clusters in such a way that the first cluster 100A contains small files and a large file that begins in the second cluster 100B continues in the next cluster 100C. In FIG. 3H, there is provided an illustration of a manner in which the large bitmap (for example car.bmp) of FIG. 3G has been compressed considerably, so that it now fits into one half cluster instead of previously taking up almost two clusters. It will be noted that the extension of the files, except a file 'theme4.png', has been changed into 'gmvc', indicating that they were compressed using another format than their original format.

Referring to FIG. 3I, there are illustrated the same files and clusters as in FIG. 3H. However, in FIG. 3I, the file 'car.gmvc' is currently being accessed, namely being read. Such reading entails that the file must first be located, then it has to be read, after which it has to be starzip-decompressed into its original format (if it is desired to be read in its original format), information of which was maintained in the system, in the file management portion. The starzip-compressed gmvc file can be first read entirely into Random Access Memory (RAM), then decompressed entirely into its original format, also into RAM. However, the starzip-compressed gmvc file can also be decompressed into its original format directly from the file container. Optionally, content that is thereby opened, namely accessed, can be stored in the original format in the file system. Optionally, an embodiment of the present disclosure enables reading a file in another format than it had originally, namely in a transcoded format. For example, the file 'car.bmp' is optionally read from the virtual container in the png file format, or into the gif file format.

Additionally, optionally, at least a portion of the data 110, or links to such, are copied also to an external device, in order to enable using the data in other devices, for example in a variety of devices of the same user, for example when transferring data from a personal computer to a smart phone, or from a smart phone to a wearable digital electronic device such as a smart watch.

It will be appreciated that even if the embodiments pursuant to the disclosure are capable of using a file in an optimized fashion directly from an optimized data container that is located in a physical non-volatile memory of the same device, it is possible that also initially storing the files, such as icons representing different functions, to the device can take place directly in an optimized manner, instead of storing the data in a known way and thereafter optimizing the storage of the data in the device.

Referring next to Table 2, there is shown an example of file name, with corresponding file size in disk data memory, with corresponding file size in bytes.

TABLE 2

Linking example

| File name | File size in disk | File size in bytes |
|---|---|---|
| border.png | 4096 | 67 |
| alpha.9.png | 4096 | 117 |
| white.png | 4096 | 842 |
| holo6.png | 4096 | 3070 |
| . . . | . . . | . . . |

In Table 3, there is shown an example of file name, file size in disk data memory, and corresponding file size in bytes.

TABLE 3

Linking example

| File name | File size in disk | File size in bytes |
|---|---|---|
| /dev/szip | 4096 | 4096 |
| border.png | 0 | 67 |
| alpha.9.png | 0 | 117 |
| white.png | 0 | 842 |
| holo6.png | 0 | 3070 |
| . . . | . . . | . . . |

As illustrated above in Tables 2 and 3, the files on the left-hand-side are moved to an optimal data container 150 and replaced with a symbolic link, so that they can still be found in the file system. It will be appreciated that the physical actual file size of the files in the left-hand-side table is only 4096 bytes, because the contents of the files are linked to a virtual file called /dev/szip.

It will be appreciated that this kind of "virtual file names" such as above make it possible firstly to open a file and, after the opening, to read/use the file. That is, the embodiments pursuant to the present disclosure do not need to know, namely be provided with information regarding, a given actual file name anymore, yet a file associated with the given file name still physically exists. Further aims of using such a virtual file name concern not always needing to store the entire file name. Instead, searching for the file is optionally executed based upon some sort of virtual identification or modified file name (for example using an abbreviation or a graphical symbol on a GUI), whereby the actual file name is always acquired, for example, from the file system when necessary. Such an identification or file handle is optionally stored, for example, into a database, so as to enable identification and processing of the file.

Now, from a point of view of regular filing systems, the physical file exists in a virtual file system, pursuant to the present disclosure. In principle, all the files of the embodiments pursuant to the disclosure are virtual from a point of view of the regular file system, even though the actual names were known. Indeed, the file names from a point of view of the regular filing systems are always actual names.

The management portion contains information about which files exist and in which locations. If a file is compressed, then the management portion will still contain the name of the uncompressed (original) file. When the data is accessed and read, it will be detected that the file has a compressed format, and on account of the original name being stored, this enables the system to reconstruct the file correctly, in the case where it is desired to read the file in its original format.

Alternatively, the file can also be transcoded during the reading process, in which case the format of the opened file will differ from its original format. In that case, the transcoding can be executed either via the original format or directly from the compressed format. For example, if it is desired to access the data in the compressed format, then it is sufficient just to read the data. Otherwise, minimally, the compressed format needs to be decoded, after which the intermediate result needs to be encoded into the desired format, unless it is possible to execute the transcoding in another, beneficial way, by decompressing and compressing the data only partially.

Referring next to Table 4, there is provided further information regarding content inside /dev/szip and a corresponding offset employed in embodiments of the present disclosure; Table 4 thus provides, for example, information regarding an image file.

TABLE 4

| Image file details | |
| --- | --- |
| Content inside /dev/szip | Offset |
| meta-data to files(s) offsets | 0 (total 47 bytes) |
| border.png( ) | 47 |
| alpha.9.png | 114 |
| white.png | 231 |
| holo6.png | 1073 |

TABLE 4-continued

| Image file details | |
| --- | --- |
| Content inside /dev/szip | Offset |
| image7.bmp | 1201 |
| instruks1.pdf | 1241 |
| instruks2.pdf | 1407 |
| . . . . . . | . . . |

Table 4 presents the image file /dev/szip which stores the files into one physical data container.

Referring next to FIG. 4, the container 150 is generated by operation of digital hardware components and/or by operation of one or more software layers that cooperate with the file system, and is optionally an integral part of the file system. For example, in an embodiment of the present disclosure wherein the file system is implemented as a software layer 200, the file system is operable to store data in clusters 100. There is utilized an additional software layer 210 for implementing the container 150 for achieving more efficient data storage in the data memory 40, pursuant to a regime as illustrated in FIG. 3A, FIG. 3B and FIG. 3C. The additional software layer 210 is operable to assist with accessing the individual data 110, as well as ensuring that it is concatenated, or otherwise stored compactly, within the clusters 100.

Thus, embodiments of the present disclosure are susceptible of achieving improved, for example maximal, cost-efficiency in data storing capacity, especially with regard to small files that are smaller than the cluster (data cluster) or block (block as physical record) defined in a file system 200. Considerable amounts of physical memory are thereby saved during data storage, namely which can be important in ecosystems and in embedded systems.

Moreover, file storing methods described in the present disclosure enable user efficient data content compression and encryption for users to be achieved; if necessary, backup copying, for example into another file system or in a centralized cloud, is provided, as aforementioned. Therefore, a decoder integrated in a data storing system of the present disclosure is able to decompress contents of a file for a given user, even if the file is compressed and encrypted. An encoder integrated in the data storing system enables transcoding a file from one format into another; namely, a file system in an ecosystem can then request, for example, a .bmp image file in the .png format, in which case the file is decoded from its original format and re-encoded into the format indicated by the file extension of the link.

Embodiments of the present disclosure can be implemented so that they are compatible with an a priori file system most commonly used in a given data "ecosystem", thereby not endangering data security in the system and not interfering with user permissions that are already established in the given data "ecosystem". An "ecosystem" here refers to a digital environment in which data is stored, processed and communicated, and should not be construed literally to relate to a biological ecosystem with living plants, animals, insects and so forth.

Moreover, embodiments of the present disclosure, as a result of storing data efficiently into data cluster, data containers and data blocks, as well as storing the data in a hierarchical manner, as aforementioned, enable an operating system to manage data stored in memory, for example captured sensor data, to be managed and processed in a more efficient manner, for example by providing for more efficient use of data memory.

The method pursuant to the disclosure is optionally implemented in two ways, as regards memory allocation. One way is to reserve/allocate a disk (or other type of data storage medium) for purposes of a file storing system pursuant to the present disclosure, in a similar manner as, for example, TrueCrypt or the Stacker disk compression utility function. Another beneficial way is to implement the method in such a way that there is no need initially to reserve a disk (or other type of data storage medium), but instead files that do not use the method pursuant to the disclosure can co-exist with files that use it, and thus the method pursuant to the disclosure utilizes clusters one by one when needed, namely in a selectively invoked manner. Therefore, it is easy to move even existing data to be used on a disk (or other type of data storage medium) optimized with this method, one file at the time. This can be executed even in a background process, without losing disk (or other type of data storage medium) space at any point by pre-allocating/pre-reserving existing disk (or other type of data storage medium) space. Moreover, since the method pursuant to the disclosure can use existing disk (or other type of data storage medium) space, it addresses a problem that known data filing systems often have, namely a problem of not being able to perform the pre-reservation of space because the disk (or other type of data storage medium) is already full.

In the foregoing, the device 10 is operable to allow addressing the data content objects 110, 60 via use of virtual files, for example.

Referring next to FIG. 5A, there is illustrated therein an embodiment pursuant to the disclosure, wherein a virtual filing system pursuant to the disclosure is implemented by using FUSE (see reference [11]), and wherein a virtual file system SZIPFS is functioning in user space. In FIG. 5A, when a file is to be accessed, a Unix/Linux terminal command "ls –l/home/jed" (which lists all files in the directory "/home/jed") is executed in a user space via an access to the shared library "glibc" in the user space, and via a virtual filing system (VFS) in a kernel space, then via aforementioned FUSE in the kernel space, then via the access library "glibc" in the user space, and then via a library associated with FUSE (namely "libfuse") in the user space, so as to access, by executing the command "./starzipfs home/jed/", an actual file that is stored in a highly efficient manner pursuant to the present disclosure in a memory-aligned manner. The contents of the directory are then communicated back as illustrated to the user as response to the command "ls –l/home/jed", executed in the user space, namely via the VFS functioning under aforementioned FUSE.

Referring to FIG. 5B, there is illustrated therein an embodiment pursuant to the disclosure, wherein a virtual file system implemented as an independent filing system, and wherein the virtual file system SZIPFS is located in kernel space. The virtual file system SZIPFS is operable to access data, alternatively store data, via use of glibc to reach ls –l/home/jed.

Modifications to embodiments of the invention described in the foregoing are possible without departing from the scope of the invention as defined by the accompanying claims. Expressions such as "including", "comprising", "incorporating", "consisting of", "have", "is" used to describe and claim the present invention are intended to be construed in a non-exclusive manner, namely allowing for items, components or elements not explicitly described also to be present. Reference to the singular is also to be construed to relate to the plural; for example, expressions such as "one or more" and "at least one of" relates to the singular in a given example embodiment of the disclosure, and to the plural in another given embodiment of the disclosure. Numerals included within parentheses in the accompanying claims are intended to assist understanding of the claims and should not be construed in any way to limit subject matter claimed by these claims.

The invention claimed is:

1. A method of operating a data memory of a device that is managed by a filing system that is configured to store data in respect of one or more clusters or blocks within the data memory, wherein the method comprises:
   (a) assembling together a plurality of data content objects into a virtual container;
   (b) storing the virtual container and its associated plurality of data content objects into one or more of the one or more clusters or blocks, wherein the plurality of data content objects are memory-aligned within the one or more clusters or blocks, wherein cluster or block size is hierarchical such that the one or more clusters or blocks include smaller clusters or blocks with room enough for one or more data content objects smaller than a pre-defined size of a cluster and larger clusters or blocks for data content objects larger than a pre-defined size of a cluster, wherein the smaller clusters or blocks and the larger clusters or blocks are used to perform alignment of the plurality of data content objects based on needs of the filing system, and wherein the alignment is based on an alignment precision that is a power of two and is smaller than any of the clusters or blocks in the plurality of clusters or blocks; and
   (c) selectively accessing an individual data content object from the plurality of data content objects in the virtual container stored within the data memory;
   wherein limits of the one or more clusters or blocks are crossed by one data content object of the plurality of data content objects if a size of the one data content object is larger than a cluster or a block whereat it is stored; and
   wherein the assembling comprises assembling, into a particular cluster or block, one or more of:
      a plurality of end portions of data content objects larger than the particular cluster or block, wherein each of the plurality of end portions of data content objects is smaller than the particular cluster or block; or
      one or more end portions of data content objects larger than the particular cluster or block and one or more data content objects, wherein each of the one or more end portions of data content objects is smaller than the particular cluster or block and each of the one or more data content objects is smaller than the particular cluster or block.

2. The method as claimed in claim 1, wherein at least two data content objects of the plurality of data content objects comprise mutually different file formats.

3. The method as claimed in claim 1, wherein the method includes comprises transcoding one or more of the plurality of data content objects when storing and/or accessing them from their virtual container (150) stored in the data memory.

4. The method as claimed in claim 1, wherein the method comprises compressing, encrypting, decompressing or decrypting one or more of the plurality of data content objects when storing and/or accessing them from their virtual container stored in the data memory.

5. The method as claimed in claim 1, wherein the method comprises arranging for at least one of the plurality of data content objects to include a link to an external database relative to the data memory.

6. The method as claimed in claim 1, wherein the plurality of data content objects corresponds to data for generating one or more icons for presentation via a graphical user interface.

7. A device comprising a data memory that is managed by a filing system that is configured to store data in respect of one or more clusters or blocks within the data memory, wherein the device is configured to:
   (a) assemble together a plurality of data content objects into a virtual container;
   (b) store the virtual container and its associated plurality of data content objects into one or more of the one or more clusters or blocks, wherein the plurality of data content objects are memory-aligned within the one or more clusters or blocks, wherein cluster or block size is hierarchical such that the one or more clusters or blocks include smaller clusters or blocks with room enough for one or more data content objects smaller than a pre-defined size of a cluster and larger clusters or blocks for data content objects larger than a pre-defined size of a cluster, wherein the smaller clusters or blocks and the larger clusters or blocks are used to perform alignment of the plurality of data content objects based on needs of the filing system, wherein the alignment is based on an alignment precision that is a power of two and is smaller than any of the clusters or blocks in the plurality of clusters or blocks; and
   (c) access selectively an individual data content object from the plurality of data content objects in the virtual container stored within the data memory;
   wherein limits of the one or more clusters or blocks are crossed by one data content object of the plurality of data content objects if the a size of the one data content object is larger than a cluster or a block whereat it is stored; and
   wherein the assembling comprises assembling, into a particular cluster or block, one or more of:
      a plurality of end portions of data content objects larger than the particular cluster or block, wherein each of the plurality of end portions of data content objects is smaller than the particular cluster or block; or
      one or more end portions of data content objects larger than the particular cluster or block and one or more data content objects, wherein each of the one or more end portions of data content objects is smaller than the particular cluster or block and each of the one or more data content objects is smaller than the particular cluster or block.

8. The device as claimed in claim 7, wherein at least two data content objects of the plurality of data content objects comprise mutually different file formats.

9. The device as claimed in claim 7, wherein the device is configured to transcode one or more of the plurality of data content objects when storing and/or accessing them from their virtual container stored in the data memory.

10. The device as claimed in claim 7, wherein the device is configured to compress, encrypt, decompress or decrypt one or more of the plurality of data content objects when storing and/or accessing them from their virtual container stored in the data memory.

11. The device as claimed in claim 7, wherein the device is configured to arrange for at least one of the plurality of data content objects to include a link to an external database relative to the data memory.

12. The device as claimed in claim 7, wherein the plurality of data content objects corresponds to data for generating one or more icons for presentation via a graphical user interface of the device.

13. A computer program product comprising a non-transitory computer-readable storage medium having computer-readable instructions stored thereon, the computer-readable instructions being executable by a computerized device comprising processing hardware to execute a method as claimed in claim 1.

14. The device as claimed in claim 7, wherein the device is a portable electronic device.

* * * * *